(12) United States Patent  
Nakagawa et al.

(10) Patent No.: US 9,174,548 B2  
(45) Date of Patent: Nov. 3, 2015

(54) RENEWABLE ENERGY POWER DEPOSITING/CHARGING MANAGEMENT SYSTEM

(71) Applicant: HONDA MOTOR CO., LTD., Tokyo (JP)

(72) Inventors: Tomoaki Nakagawa, Sakura (JP); Takayuki Kato, Saitama (JP); Junya Noguchi, Utsunomiya (JP); Shinji Takuno, Utsunomiya (JP); Yusaku Amari, Saitama (JP); Atsushi Hirosawa, Utsunomiya (JP); Hiroyuki Abe, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 253 days.

(21) Appl. No.: 13/957,863

(22) Filed: Aug. 2, 2013

(65) Prior Publication Data

US 2014/0049207 A1    Feb. 20, 2014

(30) Foreign Application Priority Data

Aug. 15, 2012  (JP) ................. 2012-179983

(51) Int. Cl.
*H02J 7/00*  (2006.01)
*B60L 11/18*  (2006.01)

(52) U.S. Cl.
CPC .......... *B60L 11/1824* (2013.01); *B60L 11/1842* (2013.01); *B60L 11/1861* (2013.01); *Y02E 60/721* (2013.01); *Y02T 10/705* (2013.01); *Y02T 10/7005* (2013.01); *Y02T 10/7044* (2013.01); *Y02T 10/7094* (2013.01); *Y02T 90/121* (2013.01); *Y02T 90/128* (2013.01); *Y02T 90/14* (2013.01); *Y02T 90/163* (2013.01); *Y04S 10/126* (2013.01)

(58) Field of Classification Search
USPC .................................. 320/101, 103, 107, 109
See application file for complete search history.

(56) References Cited

U.S. PATENT DOCUMENTS

| | | | |
|---|---|---|---|
| 2009/0200988 A1* | 8/2009 | Bridges et al. | 320/137 |
| 2011/0202217 A1* | 8/2011 | Kempton | 701/22 |
| 2011/0239116 A1* | 9/2011 | Turner et al. | 715/705 |
| 2012/0074893 A1* | 3/2012 | Cole | 320/101 |
| 2013/0020993 A1* | 1/2013 | Taddeo et al. | 320/109 |
| 2013/0179061 A1* | 7/2013 | Gadh et al. | 701/123 |
| 2013/0342310 A1* | 12/2013 | Park et al. | 340/5.7 |

FOREIGN PATENT DOCUMENTS

JP    2011-055572    3/2011

* cited by examiner

*Primary Examiner* — Brian Ngo
(74) *Attorney, Agent, or Firm* — Norman S Yi

(57) ABSTRACT

An energy power depositing/charging management system and method is provided. When energy is deposited in an energy storage station from an onboard power storage device of a vehicle, a vehicle energy management unit manages reductions in the remaining stored energy level of energy in the onboard power storage device. The vehicle energy management unit and a storage station energy management unit manage increases in the energy remaining amount of deposited energy in the energy storage station, thereby allowing for charging up to the remaining amount of deposited energy of energy identified with an ID for the vehicle in the energy storage station.

18 Claims, 11 Drawing Sheets

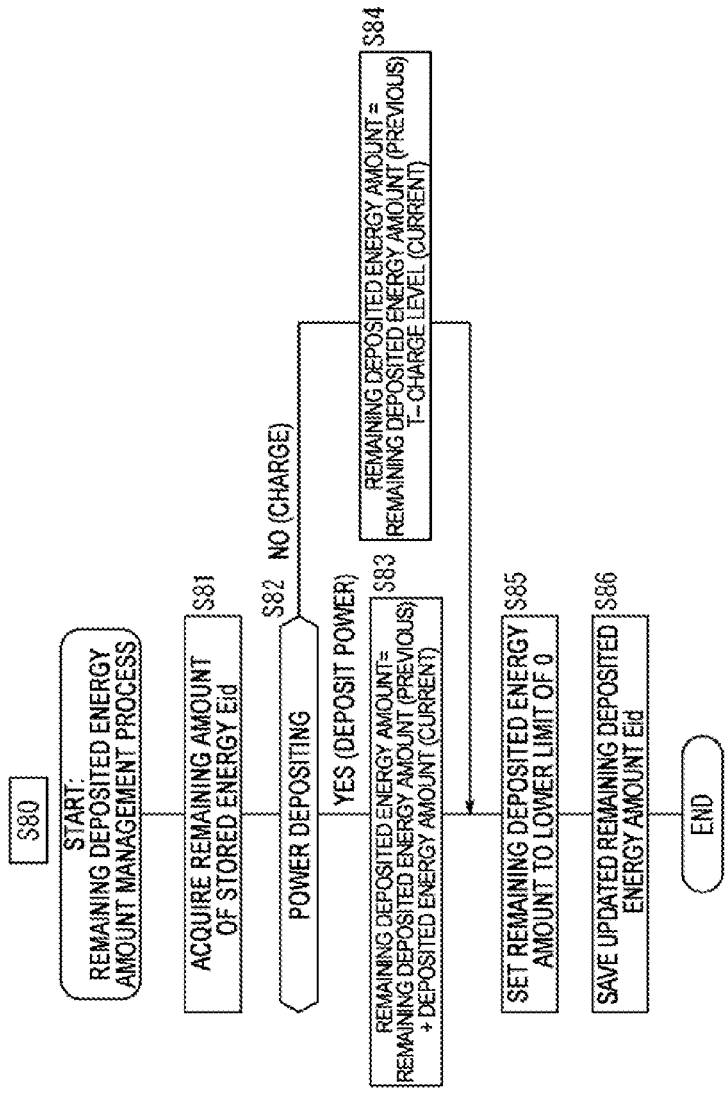

RENEWABLE ENERGY POWER DEPOSITING/CHARGING MANAGEMENT SYSTEM

CROSS REFERENCE TO RELATED APPLICATIONS

The present application claims priority under 35 U.S.C. §119 to Japanese Patent Application No. JP2012-179983, filed Aug. 15, 2012, entitled "Renewable Energy Power Depositing/Charging Management System," the contents of which are incorporated herein by reference in their entirety.

BACKGROUND

The popularity and demand for full and parital electrically-driven vehicles has increased due to their reduced negative impact on the environment. However, electrically driven vehicles have a limited travel range due to the size and capacity of a vehicle battery. Thus, there is a need and demand to overcome the travel range limitations of electrically driven vehicles due to battery size limitations.

SUMMARY

In one embodiment, an energy power depositing/charging management system is disclosed. The energy power depositing/charging management system includes an energy storage station and a vehicle. The energy storage station has a storage station energy management unit managing an amount of deposited energy identified with an unique identification (ID) code. The vehicle includes an onboard power storage device and a vehicle energy management unit. The vehicle energy management unit managing the amount of deposited energy of the onboard power storage device, the amount of deposited energy deposited from the onboard power storage device to the energy storage station, and a reduction of the remaining stored energy level. The storage station energy management unit and the vehicle energy management unit manage energy, identified with the unique identification code, manage an increase in the remaining amount of deposited energy when the energy is discharged from the onboard power storage device of the vehicle and deposited into the energy storage station.

In another embodiment a method for energy power depositing/charging is disclosed. The method includes the steps of: depositing renewable energy in an energy storage station; identifying an amount of deposited energy in the energy storage station with a unique identification (ID) code by a storage station energy management unit; charging and discharging an onboard power storage device of a vehicle with the deposited energy from the energy storage station; managing the amount of deposited energy deposited from the onboard power storage device to the energy storage station by the vehicle energy management unit; managing a reduction of the remaining stored energy level by the vehicle energy management unit; and managing an increase in the remaining amount of deposited energy when the energy is discharged from the onboard power storage device of the vehicle and deposited into the energy storage station. The storage station energy management unit and the vehicle energy management unit manage energy, identified with the unique identification code.

Other features and advantages of embodiments of the present invention Will be apparent from the accompanying drawings, and from the detailed description, that follows below.

BRIEF DESCRIPTION OF THE DRAWINGS

FIG. 11 is a flow chart of a remaining amount of deposited energy management process, according to one embodiment of the present disclosure.

DETAILED DESCRIPTION

Figure 1:
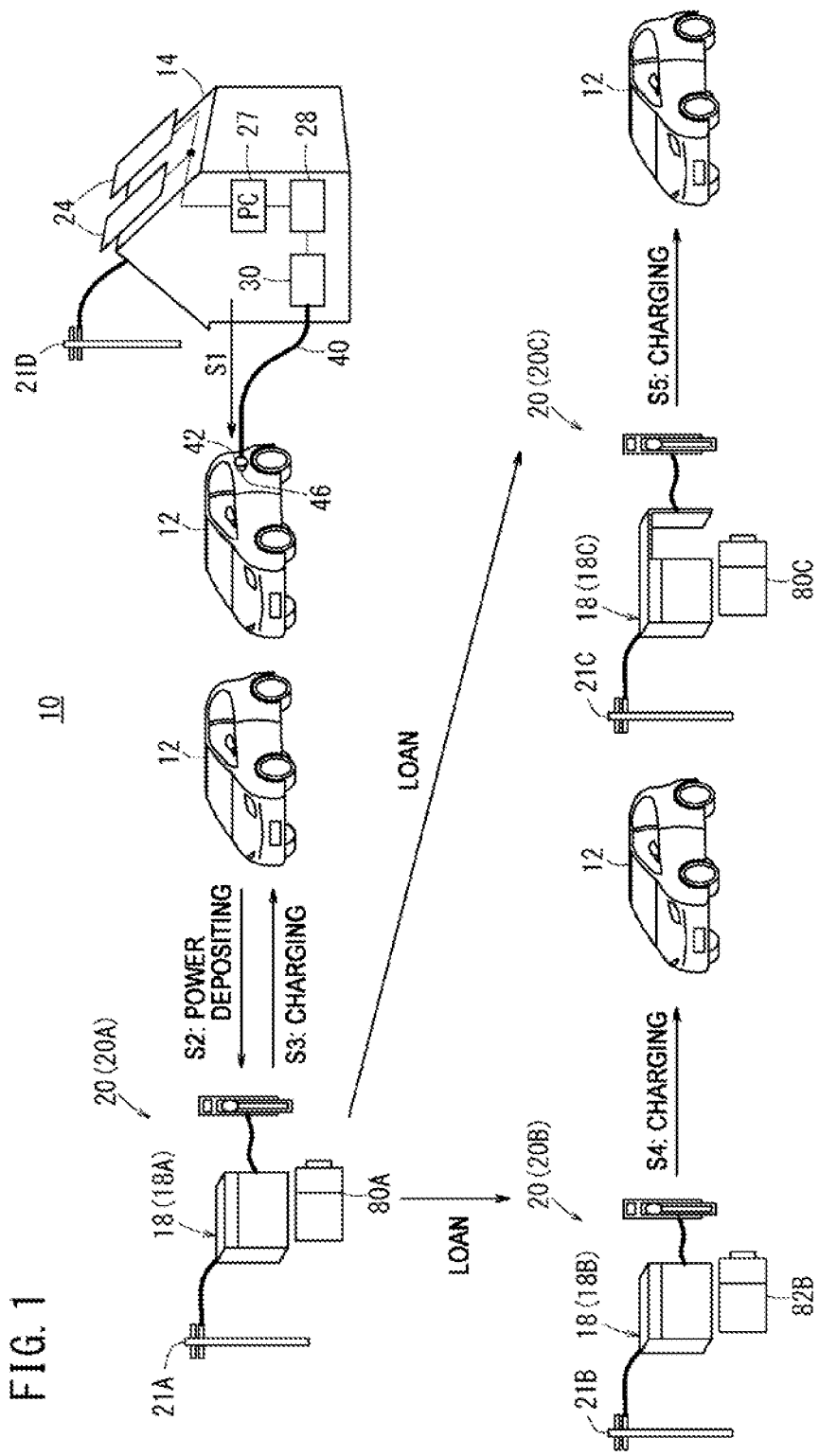
FIG. 1 is a schematic illustration of a renewable energy power depositing/charging management system according to one embodiment of the present disclosure.

The present disclosure describes an energy power depositing/charging management system 10 applied to a vehicle 12. Vehicle 12 is preferably an electrically driven vehicle such as an electric vehicle (EV), a plug-in hybrid electric vehicle (PHEV), a plug-in fuel cell vehicle (PFCV), or the like, using electricity as an energy source and an electric motor as a motive power source. However, the present disclosure is not limited to an electric vehicle, and may be applied to any vehicle provided with an onboard power storage device 22, such as a battery (secondary cell), capable of being charged by an external charging device, including a residence 14 and an energy storage station 20. Additionally, onboard power storage device 22 may include a capacitor or the like that is similarly capable of charging and discharging power or energy.

Power depositing refers to the act of a vehicle or a user of the vehicle attaching an identification code (ID) identifying renewable energy stored in an onboard power storage device (battery) of the vehicle as belonging to oneself (the vehicle or the user) and discharging or depositing renewable energy to an external energy storage station. Energy signifies electrical power (W), and energy level signifies an electrical power level (Wh).

Figure 2:
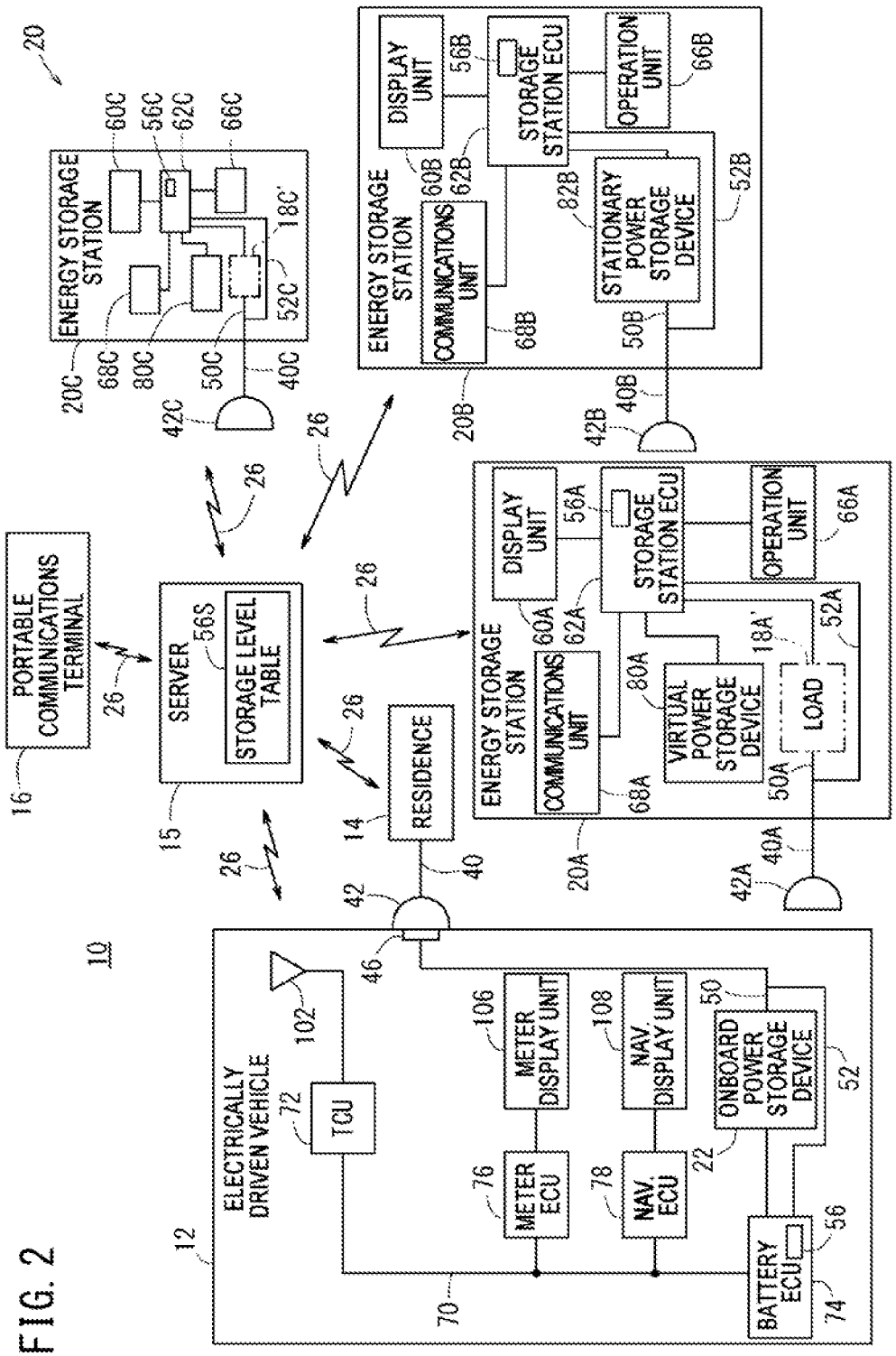
FIG. 2 is a block diagram of the renewable energy power depositing/charging management system of FIG. 1.

A charging/discharging method involving charging the battery of a vehicle with renewable energy, and discharging and/or storing the renewable energy in a capacitor of a high-capacity power storage device of a charging/discharging station so that the user of the vehicle receives a selling price commensurate with the amount of energy stored, as disclosed in Japanese Unexamined Patent Application Publication No. 2011-055572 (see paragraphs [0011], [0028] to [0031], and FIG. 2). Power grid energy is stored in the capacitor of the high-capacity power storage device as well, and the battery of another electrically driven vehicle is charged from the high-capacity power storage device via the charging/discharging station, so that a charging fee is levied upon the user of the other electrically driven vehicle.

FIG. 1 provides a schematic illustration of a renewable energy power depositing/charging management system 10 according to one embodiment of the present disclosure.

FIG. 2 provides a block diagram of components of renewable energy power depositing/charging management system 10 of FIG. 1.

Renewable energy power depositing/charging management system 10 may include vehicle 12, an user's residence 14, energy storage stations 20 (20A, 20B, and 20C) at external retail stores 18 (18A, 18B, and 18C) respectively, a portable communications terminal 16 belonging to an user, a server 15, and a communication network 26 (communication line).

Retail store 18, energy storage station 20, and residence 14 are each configured to be supplied with power/energy from power grid energy sources through nearby utility poles 21A-21D or the like.

Residence 14 may be provided with a solar cell panel 24 functioning as a power-generating device for renewable energy (abbreviated "RE" where indicated in the drawings and the like), a residential power storage device 28 (stationary power storage device) connecting to solar cell panel 24 via a power conditioner 27, and a residential charging/discharging device 30. Renewable energy generated by solar cell panel 24 is stored in residential power storage device 28. Moreover, apart from solar power, the renewable energy used can be another form of low $CO_2$ emission energy, such as wind power, geothermal power, or the like.

Residential charging/discharging device 30 is connected to a charging/discharging plug 42 (also referred to simply as "plug 42") via a cable 40. Cable 40 is constituted by a power line 50 and a control line 52 (see FIG. 2). Plug 42 attached to the tip of cable 40 of residential charging/discharging device 30 is removably connected to a lidded charging/discharging port 46 ("port"), not shown in the drawings, provided in vehicle 12. In the following description, identical or corresponding elements, such as the plug 42, will be identically labeled, or labeled with identical labels along with additional letters A, B, C, and the like, for ease of comprehension.

Retail store 18 may be a convenience store or any consumer retail outlet. In one embodiment of the present disclosure, a retail store 18A and a retail store 18B belong to the same capital group, while a retail store 18C belongs to a different capital group.

Portable communications terminal 16 belonging to the user of vehicle 12 includes a control unit, a display unit, a communications unit, and an operation unit. In one embodiment of the present disclosure, a smart phone provided with a data communication function, a telephone function, and the like, may serve as portable communications terminal 16. Please note, the present disclosure contemplates portable communications terminal 16 may also include a portable telephone, tablet terminal, mobile personal computer (PC), and the like.

Server 15 is provided with a storage level table 56S (also referred to as a "storage level memory unit" or a "remaining amount of deposited energy memory unit") allowing vehicle 12 to recall/remember an amount of renewable energy stored in a virtual power storage device 80 and/or a stationary power storage device 82B at each energy storage station 20 as a remaining amount of deposited energy Eid according to an ID (identification code) constituted by individual identifying information such as, but not limited to, a VIN of vehicle 12, or an ID for the user of the vehicle. The remaining amount of deposited energy Eid is used by server 15, energy storage station 20, and/or vehicle 12 to identify and manage the energy as belonging to vehicle 12 or the user of the vehicle. Thus the amount of renewable energy belonging to the remaining amount of deposited energy Eid is also referred to as a (vehicle 12 or user) remaining amount of deposited energy Eid of renewable energy tagged with an ID.

Server 15 is connected to portable communications terminal 16, energy storage station 20, and vehicle 12 by a communication line 26. Communication line 26 may be a mobile communications line, a public communications line, or the like.

Energy storage stations 20A and 20C are provided with virtual power storage devices 80A and 80C, respectively. Energy storage station 20B is provided with a stationary power storage device 82B. Please note, the present disclosure contemplates a configuration in which one energy storage station 20 is provided with a virtual power storage device 80 and a stationary power storage device 82B.

Energy storage stations 20A-20C are each provided with a storage station ECU 62A-62C, respectively, constituting a control unit and functioning as a storage station energy management unit, display units 60A-60C, respectively, constituting a display connected to storage station ECU 62A-62C, an operation unit 66 (66A through 66C), and a communications unit 68 (68A through 68C).

Energy storage stations 20A and 20C are further provided with loads 18A' and 18C' constituted by loads from retail stores 18A and 18C themselves. Power grid energy is supplied to loads 18A' and 18C' and stationary power storage device 82 from the corresponding power grid energy sources 21A through 21C, as well as deposited renewable energy.

When performing charging (power depositing) from vehicle 12 at energy storage station 20B, upon connection of stationary power storage device 82B of energy storage station 20B to port 46 of vehicle 12 via a plug 42B and a cable 40B, renewable energy supplied (discharged) by onboard power storage device 22 is deposited in stationary power storage device 82B as renewable energy tagged with the ID for vehicle 12 (actual charging with real energy is performed).

Meanwhile, when performing charging (power depositing) from vehicle 12 at energy storage station 20A (20C), upon connection of load 18A' (18C') of energy storage station 20A (20C) to port 46 of vehicle 12 via a plug 42A and a cable 40A (or a plug 42C and a cable 40C), the renewable energy supplied (discharged) by onboard power storage device 22 is consumed by load 18A' (18C') of retail store 18A (18C), and power grid energy corresponding to the amount of energy consumed is deposited in virtual power storage devices 80A and 80C as renewable energy tagged with an ID (virtual energy charging is performed).

Each instance of the remaining amount of deposited energy Eid (stored amount) of the renewable energy tagged with the ID for vehicle 12 in virtual power storage devices 80A and 80C and stationary power storage device 82B is stored in storage level table 56S of server 15 via communication line 26 as the remaining amount of deposited energy Eid.

Moreover, each time an instance of the remaining amount of deposited energy Eid (data) for the renewable energy tagged with the ID for vehicle 12 stored in energy storage station 20 (20A, 20B, and 20C) is updated in energy storage station 20 (20A, 20B, and 20C) during power depositing or charging, the remaining amount of deposited energy Eid is synchronized and updated in storage level table 56S of server 15 via communication line 26.

In such cases, there may be a plurality of different vehicles, as vehicle 12, with the remaining amount of deposited energy Eid recorded in and managed by storage level table 56S. Every time that an instance of the remaining amount of deposited energy Eid (data) for different renewable energy tagged with an ID for a different vehicle 12 stored in energy storage station 20 (20A, 20B, and 20C) is updated in energy storage station 20 (20A, 20B, and 20C) during power depositing or charging, each of the instances of the remaining amount of deposited energy Eid are synchronized and updated as different levels of renewable energy tagged with an ID in storage level table 56S of server 15 via communication line 26.

Moreover, the instances of the remaining amount of deposited energy Eid for respective energy storage station 20 (20A, 20B, and 20C) are stored in storage level tables 56A, 56B, and 56C (storage level memory unit or remaining deposited energy level memory unit) of storage station ECUs 62A, 62B, and 62C as the remaining amount of deposited energy Eid (data) for the renewable energy tagged with the ID for vehicle 12 stored in energy storage station 20 (20A, 20B, and 20C).

An instance of the renewable energy remaining amount of deposited energy Eid for vehicle 12 for each of energy storage stations 20 (20A, 20B, and 20C) is remembered in storage level table 56 (also referred to as "storage level memory unit" or "remaining deposited energy level memory unit") of a battery ECU 74 of vehicle 12.

In FIG. 2, vehicle 12 has a communication line 70, such as a controller area network (CAN) or the like. Communciation line 70 allows bi-directional communication between: a telematics control unit (TCU) 72 (communications control unit), a meter ECU 76 (meter control unit), a navigation ECU 78 (navigation control unit), battery ECU 74 (onboard power storage device control unit), and the like. An antenna 102 is connected to TCU 72.

A meter display unit 106 displays vehicle speed, the remaining stored energy level state of charge (SOC) of onboard power storage device 22, the remaining amount of deposited energy Eid of externally deposited renewable energy, and the like. Meter display unit 106 is connected to meter ECU 76 and may be provided with a touch panel (operation unit) and a display (display unit). The remaining stored energy level SOC is sum of the renewable energy remaining stored energy level SOCre and power grid energy remaining stored energy level SOCge (SOC=SOCre+SOCge).

Onboard power storage device 22 and port 46 to which power line 50 and control line 52 are connected is connected to battery ECU 74. Moreover, as described above, battery ECU 74 is provided with storage level table 56 of remaining amount of deposited energy Eid (both for each energy storage station 20 and the total thereof; normally refers to the total level) of renewable energy tagged with the ID of the user deposited in energy storage stations 20A, 20B, and 20C.

Storage station ECUs 62A through 62C, TCU 72, meter ECU 76, and battery ECU 74 are each constituted by a computer including a microprocessor and having a central processing unit (CPU), ROM (including EEPROM) acting as memory, random access memory (RAM), as well as an input/out device such as an A/D converter or a D/A converter, a timer acting as a timekeeping unit, and the like. The CPU loads and executes programs recorded in the ROM, in order to function as various functional-performing units (function-performing units), such as a control unit, a calculator unit, and a processor unit.

Figure 3:
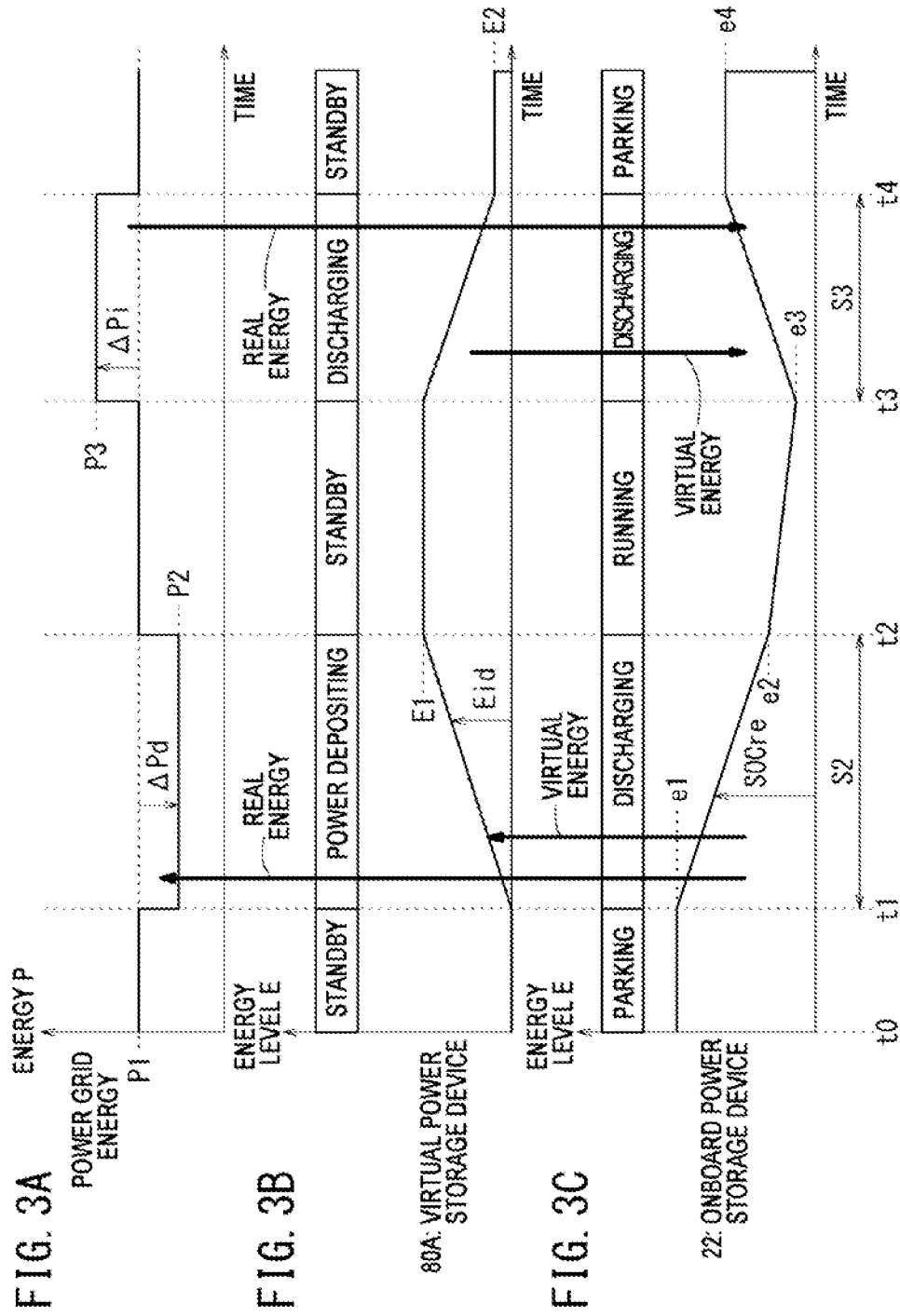
FIG. 3A is a time chart showing changes in electrical power from power grid energy according to one embodiment of the present disclosure.
FIG. 3B is a time chart showing changes in virtual power storage device electrical power levels, in relation to FIG. 3A.
FIG. 3C is a time chart showing changes in the remaining capacity of an onboard power storage device, in relation to FIGS. 3A and 3B.

FIGS. 3A, 3B, and 3C provide a graph of an overall operation of renewable energy power depositing/charging management system 10 in relation with time, according to one embodiment of the present disclosure.

Renewable energy power depositing/charging management system 10 stores/deposits renewable energy in onboard power storage device 22 of vehicle 12 at an energy storage station 20 provided at a retail store 18 or the like, separate from residence 14, during excursions as renewable energy tagged with an ID belonging to either vehicle 12 or a specific user. During excursions, emergencies, or the like, onboard power storage device 22 of vehicle 12 can be charged with renewable energy tagged with the ID of vehicle 12 or the user stored (deposited) in energy storage station 20, a process which may be referred to as "payback charging".

For example, first, at a time prior to time t0(a retail store 18A parking beginning time, described below), renewable energy from solar cell panel 24 of residence 14 is stored in residential power storage device 28 via power conditioner 27. If it is too difficult to install a costly residential power storage device 28, a virtual power storage device (memory device) may be provided in lieu of residential power storage device 28, as in the case of virtual power storage device 80A of energy storage station 20A.

In such cases, a configuration in which the renewable energy generated by solar cell panel 24 is consumed by household electronics in residence 14, and the consumed portion of the renewable energy is hypothetically stored in virtual power storage device provided in lieu of residential power storage device 28 is also contemplated by the present disclosure.

Next, when charging plug 42 of residence 14 is inserted into port 46 of vehicle 12, onboard power storage device 22 is charged with the renewable energy stored in residential power storage device 28 under the control of residential charging/discharging device 30 and battery ECU 74 in sequence S1 (control procedure or control sequence) shown by the arrows in FIG. 1, and managed by battery ECU 74 as renewable energy remaining stored energy level SOCre. Remaining stored energy level SOCre and remaining amount of deposited energy Eid stored in storage level memory unit 56, as described above, are updated in meter ECU 76 in real time and displayed on meter display unit 106 when a main switch of vehicle 12 is in an ON state.

If a virtual power storage device is used in lieu of a residential power storage device 28, a portion of power grid energy from power grid energy source 21D of residence 14 equal to the level of renewable energy remembered in the virtual power storage device is considered renewable energy, with which onboard power storage device 22 is charged. If the virtual stored power level of the virtual power storage device is zero, the power grid energy from residence 14 is used to charge onboard power storage device 22 as power grid energy. All the energy used to charge onboard power storage device 22 is preferably renewable energy.

Next, vehicle 12 drives to retail store 18A (see FIG. 1) and parks. Energy level e (electrical power level) of onboard power storage device 22 while vehicle 12 is in a standby state from a parking beginning time t0 to a parking continuation time t1 in FIG. 3A through 3C is e=e1 (see FIG. 3C). The remaining amount of deposited energy Eid indicating the level of renewable energy tagged with an ID in virtual power storage device 80A of energy storage station 20A provided at retail store 18A from time t0 to t1 is Eid equals 0. Power grid energy P supplied from power grid energy source 21A of retail store 18A from time t0 to t1 and consumed is P equals P1.

At time t1, plug 42A of energy storage station 20A provided at retail store 18A is connected to port 46 of vehicle 12 and a power depositing (discharging) operation and the deposited power amount are selected and performed using operation unit 66A. Then, during sequence S2 (FIG. 1), the renewable energy stored in onboard power storage device 22 is consumed by load 18A' of retail store 18A under the control of battery ECU 74 and storage station ECU 62A, and the integrated value of the consumed energy is deposited in virtual power storage device 80A as the remaining amount of deposited energy Eid of renewable energy tagged with an ID from time t1 to t2 (see FIG. 3B).

During time t1 to t2, power grid energy P supplied from power grid energy source 21A and consumed at retail store 18A is reduced by a portion $\Delta Pd$ from a power grid energy P1 to a power grid energy P2 ($\Delta Pd=P1-P2$). Thus, the total amount of power grid energy and renewable energy consumed at retail store 18 [power grid energy+renewable energy (renewable energy is marked with positive/negative sign)] is constant (power grid energy P1) from time t0 to t4, see FIG. 3A.

At time t2, disconnection of plug 42A of energy storage station 20A from port 46 of vehicle 12 acts as a trigger for storage station ECU 62 of energy storage station 20A to communicate with server 15 via communications unit 68A and communication network 26, and remaining amount of deposited energy Eid for the renewable energy tagged with the ID for vehicle 12 in storage level table 56S of server 15 is altered from Eid=0 to remaining amount of deposited energy Eid=E1. Energy level E1 is equal to e1−e2. Therefore, at time t1, the remaining amount of deposited energy Eid of the renewable energy tagged with an ID in virtual power storage device 80A of energy storage station 20A is synchronized and set to the same value as energy level E1 in storage level table 56A of energy storage station 20A, storage level table 56S of server 15, and storage level table 56 of vehicle 12 to which the ID belongs.

During time t2 to t3, vehicle 12 drives using the energy in onboard power storage device 22, and returns to energy storage station 20A provided at retail store 18A and parks. At time t3, energy level e of onboard power storage device 22 is reduced from e=e2 to e=e3.

At time t3, when plug 42A of energy storage station 20A provided at retail store 18A is connected to port 46 of vehicle 12, the charge amount is designated using operation unit 66A, and a charging process is selected and performed, power grid energy P consumed by load 18A' of retail store 18A is increased by a portion $\Delta Pi$ from power grid energy P=P1 to P=P3 ($\Delta Pi=P3-P1$) under the control of battery ECU 74 and storage station ECU 62 in sequence S3 (FIG. 1). Onboard power storage device 22 is charged with the integrated value of this real energy increase $\Delta Pi$ as the level e of renewable energy tagged with an ID, and renewable energy tagged with an ID deposited in virtual power storage device 80A is virtually discharged (paid back) and reduced. When onboard power storage device 22 is being charged, power grid energy P (specifically, $\Delta Pi$) supplied from power grid energy source 21A connected to load 18A' is supplied to onboard power storage device 22 via plug 42A of energy storage station 20A and port 46 of vehicle 12 for charging.

When plug 42A of energy storage station 20A is disconnected from port 46 of vehicle 12 at time t4, this acts as a trigger for storage station ECU 62 of energy storage station 20A to communicate with server 15 via communications unit 68A and communication network 26, remaining amount of deposited energy Eid of the renewable energy tagged with the ID for vehicle 12 in storage level table 56S is updated from energy level E1 (Eid=E1) to energy level E2 (Eid=E2), and the remaining amount of deposited energy Eid for renewable energy tagged with an ID for personal virtual power storage device 80A is updated to energy level E2. Simultaneously, battery ECU 74 of vehicle 12 updates the remaining amount of deposited energy Eid of the renewable energy tagged with an ID stored in virtual power storage device 80A of energy storage station 20A memorized in personal memory device to energy level E2 (see FIG. 3B). Starting at t4, vehicle 12 is placed into a parked state. It is to be noted that the reduction portion E1−E2 from time t3 to t4 of the stored energy level (remaining amount of deposited energy Eid for the renewable energy tagged with an ID) in virtual power storage device 80A is equal to the increase portion e4−e3 of the remaining stored energy level SOCre of onboard power storage device 22 (E1−E2=e4−e3).

For example, the cost for depositing power (discharging) at retail store 18A from time t1 to t1 and the fee for charging from time t3 to t4 is zero.

Subsequently, the level of the renewable energy stored in onboard power storage device 22 decreases as vehicle 12 is driven. Vehicle 12 visits another retail store 18B, operation unit 66B is operated at energy storage station 20B provided at retail store 18B. Referring to sequence S4: charging of FIG. 1, an operation of charging using a designated amount of personal renewable energy tagged with an ID out of the remaining amount of deposited energy Eid stored and managed via by storage level table 56S of server 15 is selected and performed, and onboard power storage device 22 is charged from stationary power storage device 82B.

At this time, the remaining amount of deposited energy Eid for the renewable energy tagged with an ID in storage level table 56S of server 15 is reduced by the same portion, thereby synchronously reducing the remaining amount of deposited energy Eid for the renewable energy tagged with an ID in storage level table 56A of virtual power storage device 80A of energy storage station 20A by that same portion. Retail store 18B belongs to the same capital group as retail store 18A, so it is preferable to allow charging to be performed at no cost.

Furthermore, when onboard power storage device 22 of vehicle 12 is subsequently charged in a similar manner at energy storage station 20C at retail store 18C from virtual power storage device 80C according to sequence S5 (FIG. 1), the remaining amount of deposited energy Eid of the renewable energy tagged with an ID constituted by the remaining amount of deposited energy Eid in storage level table 56S of server 15 is reduced by the same portion, thereby synchronously reducing the remaining amount of deposited energy Eid of the renewable energy tagged with an ID in virtual power storage device 80A of energy storage station 20A by that same portion. If retail store 18C belongs to a different group than retail stores 18A and 18B, a fee may be charged to perform charging. The fee may be paid using renewable energy tagged with an ID in lieu of cash or the like.

A user can access server 15 to check the current remaining amount of deposited energy Eid for that user stored in storage level table 56S, which is displayed on the display unit of portable communications terminal 16.

It is also possible to operate meter display unit 106 of meter ECU 76 or navigation display unit 108 of the NAV. ECU 78 of vehicle 12, thereby displaying the remaining amount of deposited energy Eid being sent from server 15 via TCU 72 and communication network 26 or the remaining amount of deposited energy Eid memorized in personal storage level table 56 upon meter display unit 106 or navigation display unit 108 for confirmation.

By managing the remaining amount of deposited energy Eid on server 15 in this way, there is effectively no need for vehicle 12 and energy storage stations 20A through 20C constituting clients to manage their own stored levels of renewable energy.

As discussed above, renewable energy power depositing/charging management system 10 according to the embodiment described above is provided with vehicle 12 and energy storage stations 20A through 20C.

Battery ECU 74 of vehicle 12 manages the remaining stored energy level SOCre of renewable energy in onboard power storage device 22, and manages the remaining amount of deposited energy Eid of the renewable energy deposited from onboard power storage device 22 into energy storage stations 20A through 20C.

Energy storage stations 20A through 20C manage the remaining amount of deposited energy Eid of renewable energy tagged with the ID for vehicle 12. When the renewable energy is discharged from onboard power storage device 22 of vehicle 12 and deposited in energy storage stations 20A through 20C, battery ECU 74 manages the reduction in remaining stored energy level SOCre, and battery ECU 74 and storage station ECUs 62A through 62C together manage the increase in the remaining amount of deposited energy Eid, thereby allowing, for example, for one or multiple chargings (similar to payouts) of renewable energy tagged with the ID for vehicle 12 from energy storage stations 20A through 20C up to, for example, the remaining amount of deposited energy Eid.

Energy storage stations 20A through 20C are provided at retail stores 18A through 18C, but may also be provided, for example, at public buildings such as city halls, municipal auditoriums, and the like. The customer-attracting effects yielded by the novel arrangement of depositing power at retail stores 18A through 18C present the possibility of increased sales at retail stores 18A through 18C, and of increased resident-friendliness at public buildings.

Energy storage station 20 may have stationary power storage device 82B in which renewable energy tagged with an ID is deposited as real energy, like energy storage station 20B, or may not have one, like energy storage stations 20A and 20C. If energy storage station 20 does not have a stationary power storage device 82B, the energy storage station is configured so that the renewable energy tagged with an ID discharged from onboard power storage device 22 is consumed by loads 18A' and 18C', and the remaining amount of deposited energy Eid is updated to the portion of the renewable energy tagged with an ID equivalent to the consumed energy as the deposited power amount.

Such a configuration allows for diversity in the expansion into the marketplace of renewable energy power depositing/charging management system 10.

In practice, when energy storage station 20 actually pays back part or all of the deposited renewable energy tagged with an ID to charge vehicle 12, if stationary power storage device 82B is present, energy is paid back from stationary power storage device 82B to charge onboard power storage device 22 of vehicle 12. On the other hand, if stationary power storage device 82B is not provided, onboard power storage device 22 of vehicle 12 is charged by power grid energy, and the remaining amount of deposited energy Eid is reduced to match the balance.

Moreover, while it is possible for battery ECU 74 of vehicle 12 and energy storage station 20 to mutually manage the remaining amount of deposited energy Eid of renewable energy tagged with an ID via direct communication, it is also acceptable, as described above, for there to be further provided a server 15 connected to energy storage station 20 and to TCU 72 connected to battery ECU 74 functioning as the vehicle energy management unit of vehicle 12 via communication network 26 and serving to manage vehicle 12 and energy storage station 20 as clients. In this case, the remaining amount of deposited energy Eid for the renewable energy tagged with an ID of vehicle 12 is managed on storage level table 56S of server 15.

By having portable communications terminal 16 of the user of vehicle 12 and/or TCU 72 installed in vehicle 12 be connected to server 15 via communication network 26, and displaying the remaining amount of deposited energy Eid on the display unit of portable communications terminal 16 and/or meter display unit 106 or navigation display unit 108 functioning as an onboard display unit connected to TCU 72, it is possible for a user to check the remaining amount of deposited energy Eid of renewable energy at a suitable time or location.

Power Depositing/Charging

Figure 4:
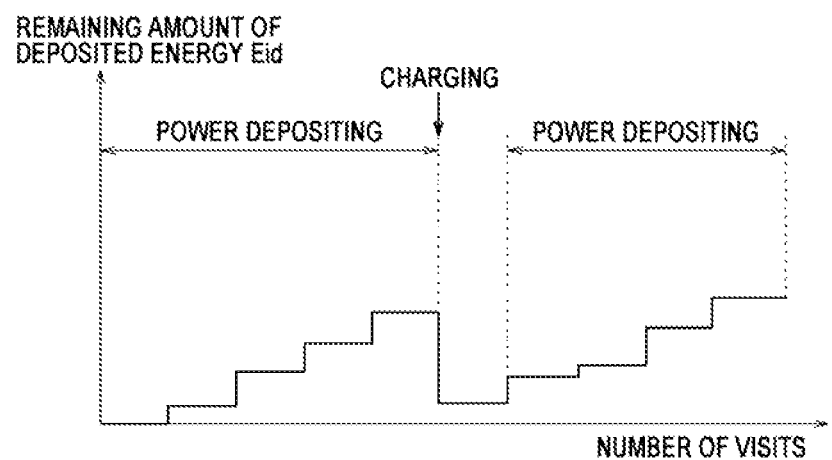
FIG. 4 is an illustration of power depositing and charging at an energy storage station according to one embodiment of the present disclosure.

When performing power depositing and charging at, for example, an energy storage station 20A provided at a retail store 18A such as a convenience store, as shown in FIG. 4, power is deposited bit by bit according to the number of visits, and the remaining amount of deposited energy Eid gradually increases. During charging, onboard power storage device 22 is charging with a comparatively large energy level during one visit.

If retail store 18 is provided with a renewable energy power-generating device such as a solar cell power-generating device, onboard power storage device 22 of vehicle 12 may be charged in real time using energy from the power-generating device during charging of onboard power storage device 22 with renewable energy. Alternatively, energy may be stored in stationary power storage device 82B, and onboard power storage device 22 charged using the same.

The charging/discharging process was described using a contact method, in which plugs 42 and 42A through 42C and port 46 are actually connected to perform power depositing and charging, but a non-contact method utilizing, for example, a transformer having a primary coil and a secondary coil may be substituted.

Monitoring Unit (Management Unit)

Figure 5:
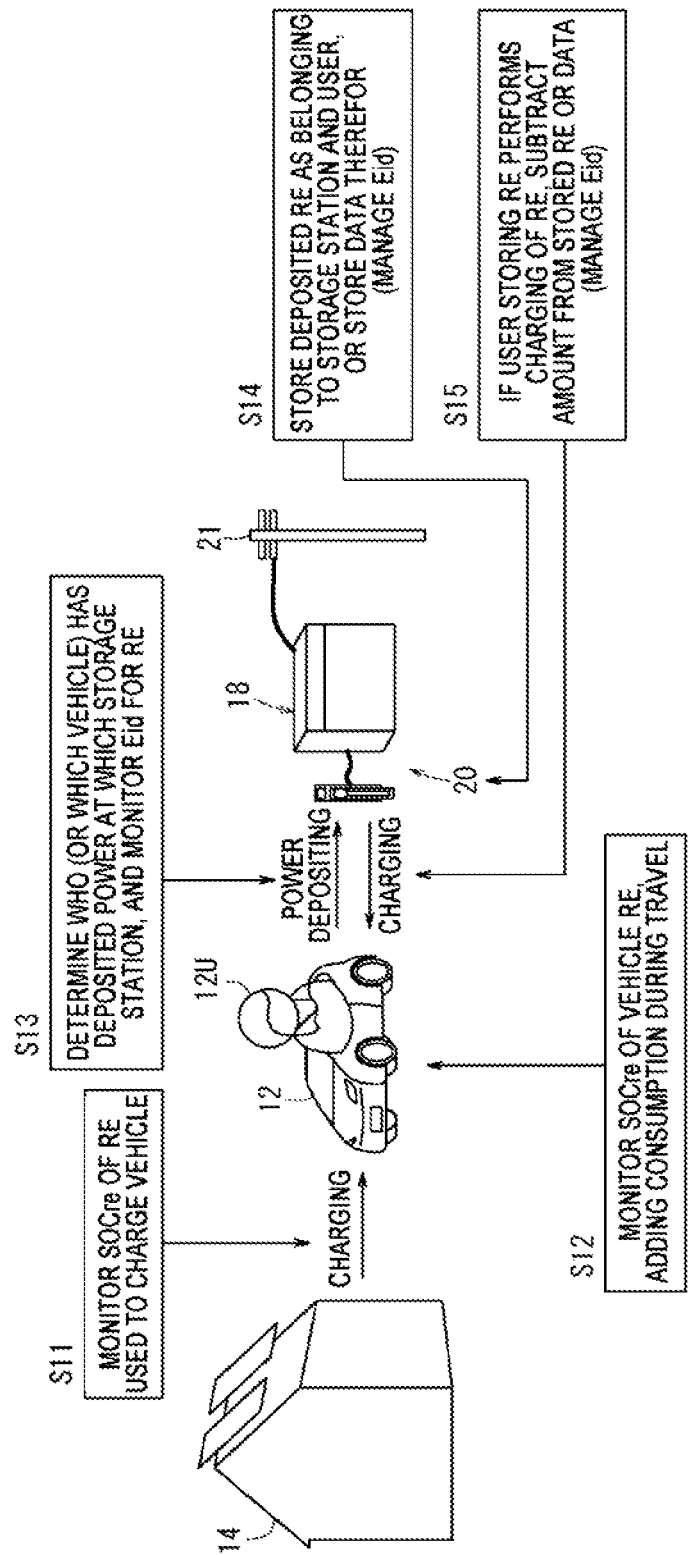
FIG. 5 is an illustration of a management unit according to one embodiment of the present disclosure.

Referring to a sequence S11 of FIG. 5, vehicle 12 is charged from residence 14, while monitoring the remaining stored energy level SOCre of the renewable energy (RE) with which vehicle 12 is charged (such monitoring may be performed by residential charging/discharging device 30, battery ECU 74, and server 15).

Next, in sequence S12, monitoring the remaining stored energy level SOCre of renewable energy along with the renewable energy consumption of vehicle 12 during driving (travel) (such monitoring may be performed by battery ECU 74 and server 15).

Next, in sequence S13, when depositing power in energy storage station 20 of retail store 18, to ascertain which energy storage station 20 vehicle 12 (or user 12U) has deposited power in, and monitor the remaining amount of deposited energy Eid of the renewable energy thereof (such monitoring being performed by battery ECU 74, storage station ECU 62, and server 15).

Next, in sequence S14, the remaining amount of deposited energy Eid of the renewable energy deposited in energy storage station 20 is managed as the property of energy storage station 20 and user 12U (vehicle 12) (if a stationary power storage device 82B is present), or data is managed (in the case of virtual power storage devices 80A and 80C) (such monitoring being performed by storage station ECUs 62A-62C and server 15).

If user 12U (vehicle 12) having stored the renewable energy performs charging from the renewable energy in energy storage station 20, such energy may be subtracted from the remaining amount of deposited energy Eid of the renewable energy itself, or from the data (such monitoring being performed by battery ECU 74, storage station ECU 62A, and server 15).

Loaning Renewable Energy

Figure 6:
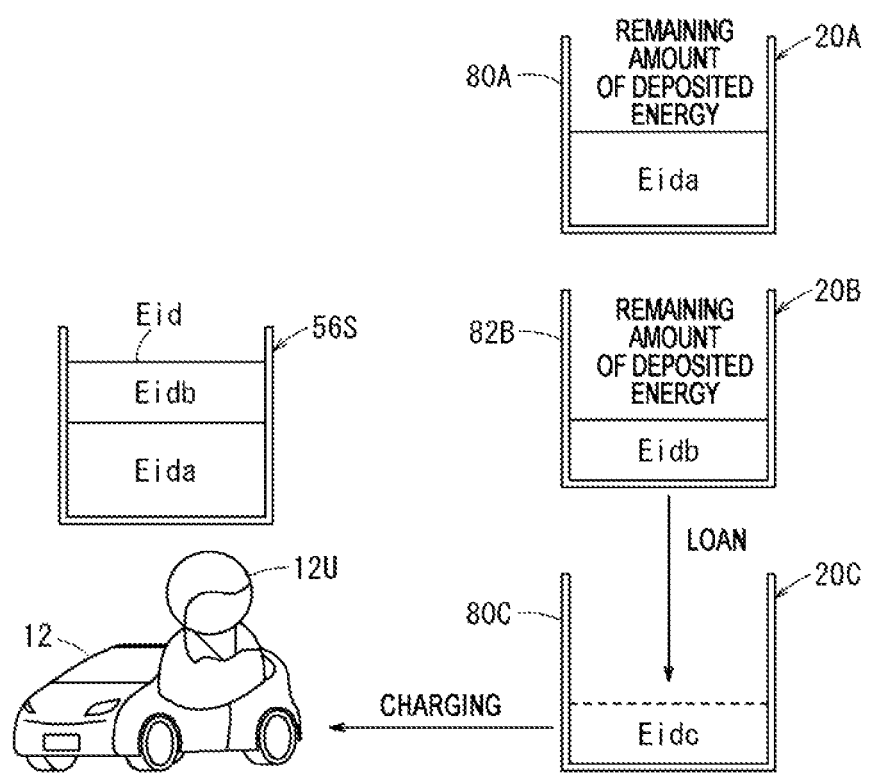
FIG. 6 is an illustration of a process of loaning renewable energy between energy storage stations according to one embodiment of the present disclosure.

If user 12U stores a remaining amount of deposited energy Eid constituted by a renewable energy remaining amount of deposited energy Eidb added to a renewable energy remaining amount of deposited energy Eida (Eid=Eida+Eidb) in storage level table 56S of server 15 as a total amount, as shown in FIG. 6, the remaining amount of deposited energy Eida is stored in virtual power storage device 80A of energy storage station 20A, and the remaining amount of deposited energy Eidb is stored in stationary power storage device 82B of energy storage station 20B.

In such cases, it is possible to charge vehicle 12 at an energy storage station 20C not actually storing renewable energy up to the remaining amount of deposited energy Eidb indicating the level of renewable energy stored in stationary power storage device 82B of energy storage station 20B and an equivalent remaining amount of deposited energy Eidc, for example. In other words, it is possible to loan renewable energy tagged with an ID.

In particular, when onboard power storage device 22 of vehicle 12 is charged from energy storage station 20, it is acceptable to take into account the payment and levying of fees according to the type of renewable energy being used for charging (power grid energy having different prices according to time of day, renewable energy generated by energy storage station 20, or renewable energy actually deposited from vehicle 12).

Power Deposit Amount Limits, Power Depositing/Charging Selection

Energy storage station 20 may be provided with limits on the power depositing time or amount per visit, or the total amount of power deposited within a certain period. For example, a limit of 30 minutes/visit, 2 kWh/visit, or the like may be set.

If there is a physical limit upon the remaining amount of deposited energy Eidb in the stationary power storage device 82B, such limits may also be taken into consideration. Limits upon the remaining amount of deposited energy Eida and Eidc of virtual power storage devices 80A and 80C may also be provided.

Figure 7:
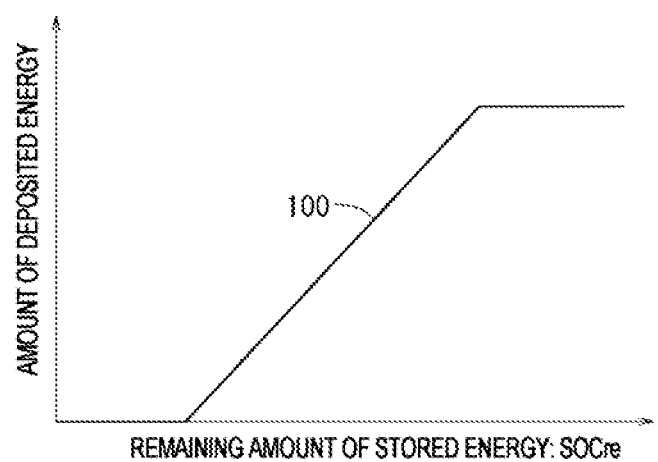
FIG. 7 is an illustration of the relationship between the remaining stored energy level of an onboard power storage device of an electrically driven vehicle and a deposited power amount according to one embodiment of the present disclosure.

The amount of power to be deposited may be set in vehicle 12 by user 12U, or a limitation may be placed on the amount of power deposited as shown by profile 100 in FIG. 7. Specifically, if the remaining stored energy level SOCre of renewable energy in onboard power storage device 22 is low, for example, 20% or less, power depositing is not performed, without exceptions (deposited power amount equals 0); and, if the remaining stored energy level SOCre is high, for example 80% or more, a constant, a fixed high deposited power amount is set. From 20% to 80%, the amount of power deposited is linearly increased according to the remaining stored energy level SOCre of renewable energy.

A configuration in which charging is automatically selected if the remaining stored energy level SOCre in onboard power storage device 22 is comparatively low, for example, 20% or less, and power depositing is automatically selected if the level is comparatively high, for example, 80% or more, is also acceptable.

Operation Flowcharts

The operation of the present disclosure will be described as follows: (i) is a flow chart description of a main process, (ii) is a flow chart description of a power storing process, (iii) is a flow chart description of a charging process, and (iv) is a flow chart description of a process of managing the remaining amount of deposited energy Eid.

Flow Chart of Main Process

Figure 8:
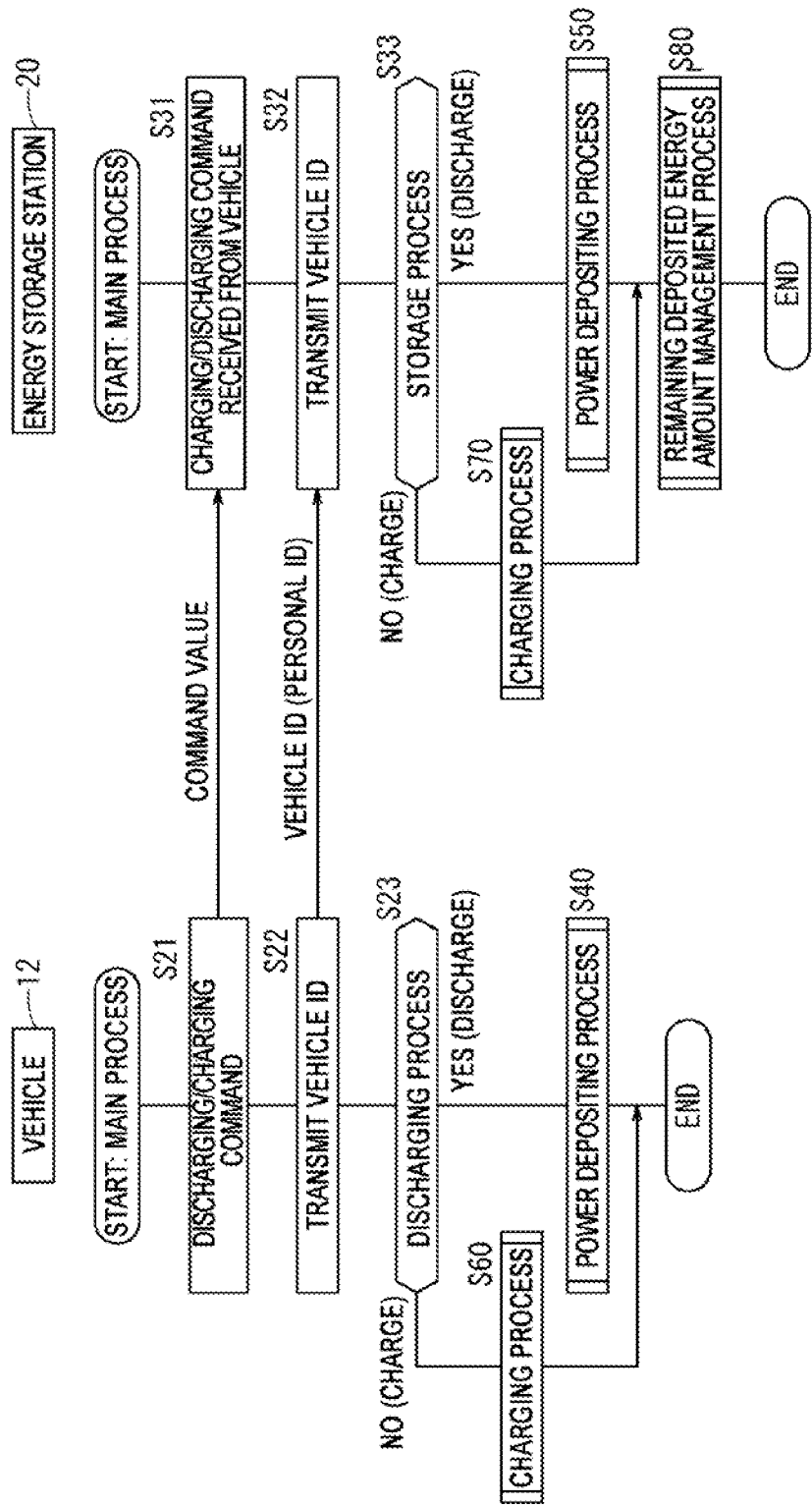
FIG. 8 is a flow chart of a main process, according to one embodiment of the present disclosure.

FIG. 8 provides an illustration of an overall process flow, according to one embodiment of the present disclosure. In step S21, a transmission of vehicle 12 having a command value indicating discharging or charging is sent to storage station ECU 62A of energy storage station 20 via a selection performed by user 12U or via automatic selection performed by battery ECU 74. Moreover, communication between battery ECU 74 of vehicle 12 and storage station ECU 62A of energy storage station 20 may be direct communication, or may be mediated by server 15.

In step S31, storage station ECU 62A receives the charging or discharging instruction from vehicle 12.

In step S22, battery ECU 74 transmits a vehicle ID (or personal ID), and storage station ECU 62A receives vehicle ID (or personal ID) in step S32.

In step S23, battery ECU 74 determines whether or not the process in step S21 is a discharging process; if the process is a discharging process, the power depositing process of step S40 is performed, and, if the process is not a discharging process but rather a charging process, the charging process of step S60 is performed.

Meanwhile, if the process in step S33 is a power depositing process, storage station ECU 62A performs the power depositing process of step S50, after which a remaining amount of deposited energy management process is performed in step S80. If the process in step S33 is not power depositing, a charging process putting storage station ECU 62A into a state of discharging is performed in step S70, after which the remaining amount of deposited energy management process is performed in step S80.

Figure 9:
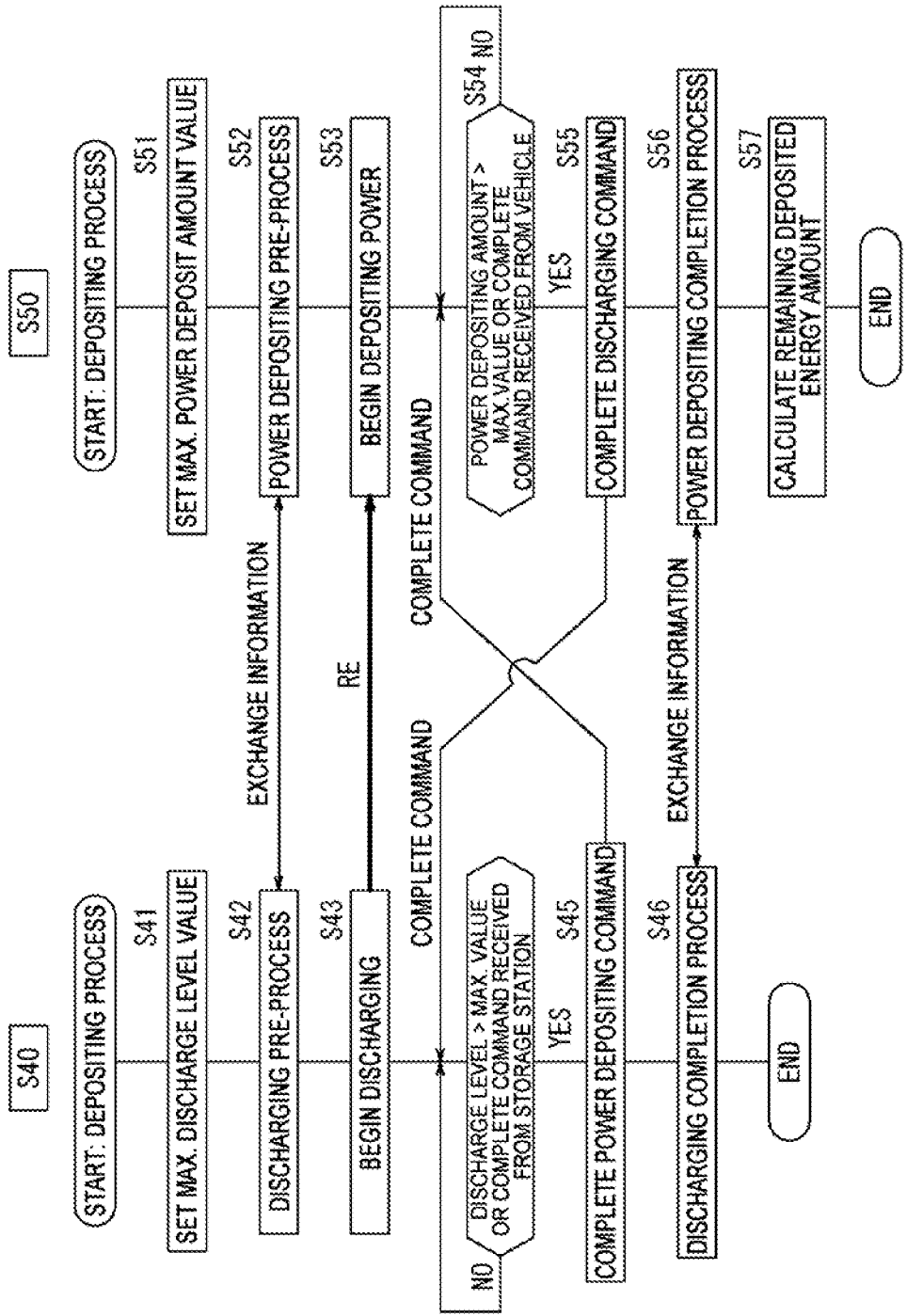
FIG. 9 is a flow chart of a power depositing process, according to one embodiment of the present disclosure.

FIG. 9 provides a flow chart detailing the power depositing process performed by battery ECU 74 in step S40 (FIG. 8) and the power depositing process performed by storage station ECU 62A in step S50 (FIG. 8).

In step S41, a maximum discharge level value (maximum value) is set in battery ECU 74. As described above, this value is set, for example, by user 12U or on the basis of the remaining stored energy level SOCre of onboard power storage device 22.

In step S51, a maximum deposited power amount value (maximum value) is set in storage station ECU 62A. As described above, this value is set according to a value set in storage station ECU 62A, or the remaining amount of deposited energy Eid in virtual power storage devices 80A and 80C or stationary power storage device 82B.

In steps S42 and S52, the information set in steps S41 and S51 is exchanged and reconciled as a discharging/power depositing pre-process, and the level of power discharged by onboard power storage device 22 and the deposited power amount in virtual power storage devices 80A and 80C or the stationary power storage device 82B is determined.

In steps S43 and S53, power discharging and depositing begins, and transmission of the renewable energy RE begins.

In step S44, it is determined whether the discharge level has exceeded the maximum value (step S41), or if a discharge completion command has been received from storage station ECU 62A in step S55, and the discharging process is continued until an affirmative result is received for one of these conditions.

Meanwhile, in step S54, it is determined whether the deposited power amount has exceeded the maximum value (step S51), or if a power depositing completion command has been received from battery ECU 74 in step S45, and the power depositing process is continued until an affirmative result is received for one of these conditions.

After one of the completion commands is issued in step S45 or step S55, a discharging completion process is performed on battery ECU 74 side in step S46, and a power depositing completion process is performed on storage station ECU 62A side in step S56.

In step S57, the remaining amount of deposited energy Eid on storage station ECU 62A side is calculated.

Figure 10:
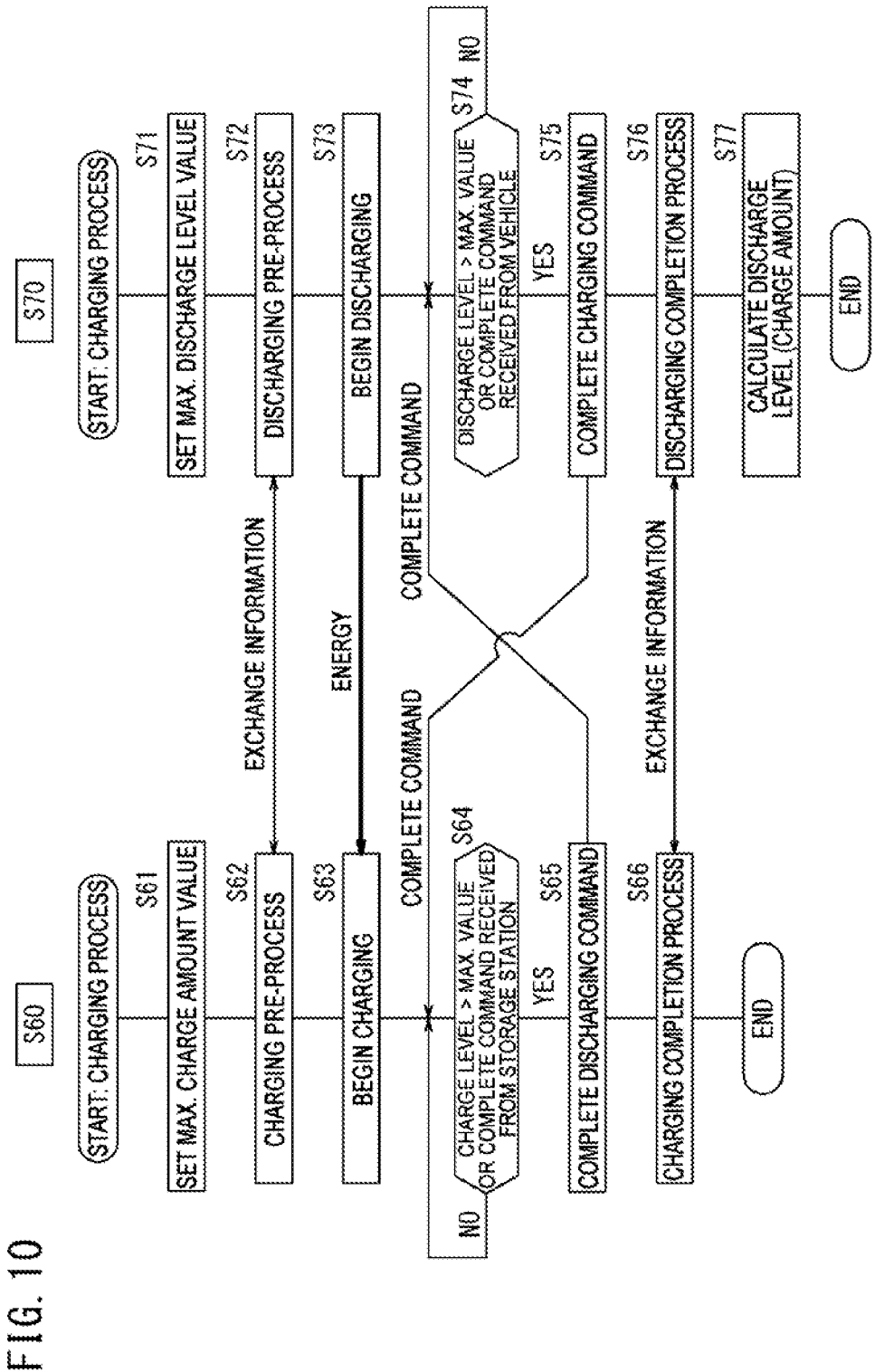
FIG. 10 is a flow chart of a charging process, according to one embodiment of the present disclosure.

FIG. 10 provides a flow chart detailing the charging process performed by battery ECU 74 in step S60 (FIG. 8) and by storage station ECU 62A in step S70 (FIG. 8).

In step S61, a maximum charge level value (maximum value) is set on battery ECU 74 side. As described above, this value is set by user 12U or on the basis of the remaining stored energy level SOCre of onboard power storage device 22.

In step S71, a maximum discharge level value (maximum value) is set on storage station ECU 62A side. As described above, this value is set according to a value set in storage station ECU 62A, or the remaining amount of deposited energy Eid in virtual power storage devices 80A and 80C or stationary power storage device 82B.

In steps S62 and S72, the information set in steps S61 and S71 is exchanged and reconciled as a charging/discharging pre-process, and the amount of power charged to onboard power storage device 22 and the level of power discharged by virtual power storage devices 80A and 80C or stationary power storage device 82B is determined.

In steps S63 and S73, charging and discharging begin, and energy transmission begins.

In S64, it is determined whether the charge amount has exceeded the maximum value (step S61), or if a charging completion command has been received from storage station ECU 62A in step S75, and the charging process is continued until an affirmative result is received for one of these conditions.

Meanwhile, in step S74, it is determined whether the discharge level has exceeded the maximum value (step S71), or if a discharging completion command has been received from battery ECU 74 in step S65, and the charging process is continued until an affirmative result is received for one of these conditions.

After one of the completion commands is issued in step S65 or step S75, a charging completion process is performed on battery ECU 74 side in step S66, and a discharging completion process is performed on storage station ECU 62A side in step S76.

In step S77, the discharge level (amount of energy used to charge onboard power storage device 22) is calculated by storage station ECU 62A.

FIG. 11 provides a flow chart for a remaining amount of deposited energy management process performed by storage station ECU 62A of energy storage station 20 in step S80 (FIG. 8).

In step S81, the current remaining amount of deposited energy Eid is acquired from storage level table 56S in server 15.

In step S82, it is determined whether the most recent process was a power depositing process. If the process was a power depositing process (YES in step S82), a new remaining amount of deposited energy Eid is calculated according to the following formula in step S83: remaining amount of deposited energy equals remaining amount of deposited energy (previous) plus/add deposited power amount (current).

In the above formula, remaining amount of deposited energy (previous) is the remaining amount of deposited energy Eid acquired in step S81, and deposited power amount (current) is the deposited power amount calculated in step S57.

Meanwhile, if it is determined in step S82 that the most recent process was not a power depositing process, the process is determined to be a charging process, and a new remaining amount of deposited energy Eid is calculated in step S84 according to the following formula: remaining amount of deposited energy equals remaining amount of deposited energy (previous) minus/less charge amount (current).

In the above formula, remaining amount of deposited energy (previous) is the remaining amount of deposited energy Eid acquired in step S81, and charge amount (current) is the amount of charged power calculated in step S77. It should be noted that the remaining amount of deposited energy and charge amount are given in levels.

Next, if the newly calculated remaining amount of deposited energy Eid is less than zero in step S85, the updated remaining amount of deposited energy Eid is set to a lower limit of zero (Eid=0).

Meanwhile, if the newly calculated remaining amount of deposited energy Eid is greater than zero in step S85, the remaining amount of deposited energy Eid newly calculated in step S83 or step S84 is sent to server 15 as the updated remaining amount of deposited energy Eid. Server 15 updates the remaining amount of deposited energy Eid in storage level table 56S to the updated remaining amount of deposited energy Eid. The remaining amount of deposited energy Eid is synchronously updated and saved in battery ECU 74 and storage level tables 56 and 56A through 56C of storage station ECUs 62A through 62C as well.

In step S86, the updated remaining amount of deposited energy Eid set to a lower limit of zero (step S85) is transmitted to server 15, and saved in storage level table 56S of server 15.

The present disclosure is not limited to the embodiments described above, and various configurations may of course be adopted on the basis of the material disclosed in the present specification while keeping within the scope and spirit of the present disclosure.

What is claimed:
1. An energy power depositing/charging management system comprising:
  an energy storage station having:
    a storage station energy management unit managing an amount of deposited energy identified with an unique identification (ID) code; and
  a vehicle having:
    an onboard power storage device and
    a vehicle energy management unit managing:
      the amount of deposited energy of the onboard power storage device;
      the amount of deposited energy deposited from the onboard power storage device to the energy storage station; and
      a reduction of the remaining stored energy level;
  wherein the storage station energy management unit and the vehicle energy management unit manage energy, identified with the unique identification code, manage an increase in the remaining amount of deposited energy when the energy is discharged from the onboard power storage device of the vehicle and deposited into the energy storage station; and wherein the identification code links the amount of deposited energy deposited from the onboard power storage device with either: a vehicle, a specific user, a group/fleet of vehicles, or a group of users.

2. The energy power depositing/charging management system according to claim 1, wherein the energy storage station is provided at a retail store.

3. The energy power depositing/charging management system according to claim 1, wherein the vehicle is fully electrically driven vehicle or a partially electrically-driven vehicle.

4. The energy power depositing/charging management system according to claim 1, wherein the energy storage station receives and stores the energy discharged by the onboard power storage device, and the remaining amount of deposited energy of renewable energy is increased according to the amount of consumed renewable energy.

5. The energy power depositing/charging management system according to claim 1, further comprising:

the vehicle is charged using part or all of the remaining amount of deposited energy of the energy deposited in the energy storage station;

wherein the energy storage station has a stationary power storage device discharging power to charge the onboard power storage device of the vehicle; and wherein the remaining amount of deposited energy of the energy deposited in the energy storage station is linked to either: a vehicle, a specific user, a group/fleet of vehicles, or a group of users.

6. The energy power depositing/charging management system according to claim 1, further comprising:

the vehicle is charged using part or all of the remaining amount of deposited energy of the energy deposited in the energy storage station;

wherein the onboard power storage device is charged using power grid energy, and the remaining amount of deposited energy is reduced; and wherein the remaining amount of deposited energy of the energy deposited in the energy storage station is linked to either: a vehicle, a specific user, a group/fleet of vehicles, or a group of users.

7. The energy power depositing/charging management system according to claim 1, further comprising:

a communication network allowing communications between the vehicle energy management unit, the storage station energy management unit, and a server;

wherein the server manages the deposited energy, with the identification code, between the vehicle energy management unit and storage station energy management unit.

8. The energy power depositing/charging management system according to claim 7, wherein the server is a cloud server.

9. The energy power depositing/charging management system according to claim 7, further comprising:

a second energy storage station connected to the server via the communication network and managing the remaining amount of deposited energy of the energy storage station, the server reducing the remaining amount of deposited energy of the vehicle on the server when the vehicle is charged by the onboard power storage device of the vehicle from the second energy storage station;

wherein the remaining amount of deposited energy of the energy deposited in the energy storage station is linked to either: a vehicle, a specific user, a group/fleet of vehicles, or a group of users.

10. The energy power depositing/charging management system according to claim 9, further comprising:

a portable communications terminal belonging to the user of the vehicle is connected to the server via the communication network, and the remaining amount of deposited energy is displayed on a display unit of the portable communications terminal.

11. The energy power depositing/charging management system according to claim 9, further comprising:

a telematics device onboard the vehicle is connected to the server via the communication network, and the remaining amount of deposited energy is displayed on an onboard display unit connected to the telematics device.

12. A method for energy power depositing/charging comprising:

depositing renewable energy in an energy storage station;

identifying an amount of deposited energy in the energy storage station with a unique identification (ID) code by a storage station energy management unit;

charging and discharging an onboard power storage device of a vehicle with the deposited energy from the energy storage station;

managing the amount of deposited energy deposited from the onboard power storage device to the energy storage station by the vehicle energy management unit;

managing a reduction of the remaining stored energy level by the vehicle energy management unit; and managing an increase in the remaining amount of deposited energy when the energy is discharged from the onboard power storage device of the vehicle and deposited into the energy storage station, wherein the storage station energy management unit and the vehicle energy management unit manage energy, identified with the unique identification code;

wherein the identification code links the amount of deposited energy deposited from the onboard power storage device with either: a vehicle, a specific user, a group/fleet of vehicles, or a group of users.

13. The method of claim 12 further comprising:

discharging energy by the onboard power storage device with the energy storage station;

storing the energy discharged by the onboard power storage device with the energy storage station, and increasing the remaining amount of deposited energy of the renewable energy according to the amount of consumed renewable energy.

14. The method of claim 12, further comprising:

charging the onboard power storage device of the vehicle the remaining amount of deposited energy from a stationary power storage device of the energy storage station.

15. The method of claim 12, further comprising:

charging the onboard power storage device of the vehicle the remaining amount of deposited energy from a power grid; and reducing the remaining amount of deposited energy.

16. The method of claim 12, further comprising:

communicating between the vehicle energy management unit, the storage station energy management unit, and a server over a communication network; and managing the deposited energy, with the identification code, between the vehicle energy management unit and storage station energy management unit by the server.

17. The method of claim 16, further comprising:
connecting a second energy storage station to the server via the communication network;
managing, by the server, the remaining amount of deposited energy of the energy storage station, and
reducing the remaining amount of deposited energy of the vehicle on the server when the vehicle is charged by the onboard power storage device of the vehicle from the second energy storage station.

18. The method of claim 17, further comprising:
connecting a graphical user interface to the server over the communication network; and
displaying the remaining amount of deposited energy on the graphical user interface to a vehicle user.

* * * * *